United States Patent [19]

Cronin

[11] 4,382,188
[45] May 3, 1983

[54] DUAL-RANGE DRIVE CONFIGURATIONS FOR SYNCHRONOUS AND INDUCTION GENERATORS

[75] Inventor: Michael J. Cronin, Sherman Oaks, Calif.

[73] Assignee: Lockheed Corporation, Burbank, Calif.

[21] Appl. No.: 235,354

[22] Filed: Feb. 17, 1981

[51] Int. Cl.³ .................... F16H 37/08; F16H 5/42; H02K 7/10
[52] U.S. Cl. ................................ 290/1 C; 74/690; 318/13
[58] Field of Search ................ 74/687–690; 290/1 C; 318/11, 13

[56] References Cited

U.S. PATENT DOCUMENTS

| 2,077,768 | 4/1937 | Perry | 172/293 |
| 2,153,252 | 4/1939 | Hunsdorf | 172/239 |
| 2,810,844 | 10/1957 | Morrill | 310/83 |
| 2,990,503 | 6/1961 | Clark | 318/11 |
| 3,032,696 | 5/1962 | Payne et al. | 318/11 |
| 3,106,100 | 10/1963 | Tomaszek et al. | 74/690 |
| 3,736,803 | 6/1973 | Horowitz et al. | 74/690 |
| 3,861,485 | 1/1975 | Busch | 318/11 |
| 4,315,442 | 2/1982 | Cordner | 74/687 |

Primary Examiner—J. V. Truhe
Assistant Examiner—Shelley Wade
Attorney, Agent, or Firm—Victor A. DiPalma

[57] ABSTRACT

The invention is a dual-range drive system for synchronous and induction generators which may provide primary power for aircraft systems. In a first embodiment, utilization of a toroidal drive (10) in combination with a planetary drive (37) enables variable speed mechanical output from an engine (24) to be converted to a dual range mechanical input to a permanent magnet generator (26) such that the generator (26) operates at constant frequency over a preselected engine speed range and at a frequency proportional to speed over speed ranges below said preselected range. Drive logic (42), roller actuator (46) and steering control mechanism (48) form parts of a control system for steering or tilting the drive rollers (12) of the toroidal drive (10). The substitution of a "differential" toroidal drive (30) for the "straight" toroidal drive (10) enables the drive to operate in a dual-range in much the same manner, except that utilization of the differential toroidal drive (30) makes it possible to rotate the output shaft (74) in either direction. Both dual-range toroidal drive systems (10) and (30) provide means for altering the speed of the output shafts (76) and (74) respectively. The dual-range drive systems (10) and (30) are capable of operating with other power sources, such as an induction generator (102), and by utilization of power electronics (116), start panels (118), and start logic (120) are readily adaptable for operation of the generators (26), (88) and (102) in a starter mode.

34 Claims, 14 Drawing Figures

DUAL-RANGE DRIVE CONFIGURATIONS FOR SYNCHRONOUS AND INDUCTION GENERATORS

TECHNICAL FIELD

The invention relates generally to the utilization of a combination drive-generator, as a primary source of electric power in an aircraft environment and, more specifically, to the operation of the drive-generator in a dual-range manner over the speed range of the aircraft's engines. Electro-mechanical variable-speed, and differential variable-speed drive arrangements, are utilized in conjunction with various types of generators, such as permanent-magnet and wound-rotor synchronous-machines, and can be adapted to drive an induction-machine in a way that the induction-machine operates in a generating mode.

BACKGROUND AND BACKGROUND ART

Differential constant speed drives (CSD's) are used successfully in most military and commercial aircraft in use today, and their primary function is to maintain a constant speed input to a generator, when the engine varies over a 2:1 or 3:1 speed-range. While this approach, and the technology of variable-speed/constant-frequency (VSCF) have been viable for generators in the 20 to 120 kva range, the emergence of all electric airplane concepts may well dictate generator sizes in the order of 200 to 500 kva. As a consequence, the conventional constant speed drive and VSCF technologies will be adversely affected in weight, size, complexity, as well as thermal management.

Aside from the torque (and current sizing) problems that impact on weight and size of CSD's and VSCF systems, with large generators, there is the question of transmission-efficiency, which impacts on the quest for fuel efficiency. On the other hand, as has been described in co-pending U.S. patent application Ser. No. 173,111, filed July 28, 1980, for "A Direct-Driven Aircraft Generating System Providing Variable and Constant Levels of Electric Power", assigned to the assignee herein, the majority of the loads in a typical large aircraft can be powered by a generator system, whose voltage and power is proportional to frequency (engine speed).

Another consideration in design of aircraft power systems is that it would be highly desirable to utilize squirrel-cage rotor induction generators, which are extremely rugged and reliable machines. Such generators are inexpensive to construct, and they can be easily fabricated. There are, however, certain problems associated with induction generators. First, to operate as a generator, the rotor must be driven above its "synchronous speed"; i.e., in a negative-slip condition. Second, the machine cannot operate as a generator unless there is at least one synchronous power source in the system to excite it. Further, the machine cannot supply either its own excitation or any (lagging) reactive kilovars, reflected by the loads in the system.

A variety of differential and variable-speed drives, utilized in conjunction with electric machines, are known in the prior art. Such drives are typified by those disclosed in U.S. Pat. Nos. 2,810,844 to Morrill; 3,032,696 to Payne et al; 2,077,768 to Perry; 2,990,503 to Clark; and 2,153,252 to Hansdorf.

In the '844 patent, a constant speed drive type system is disclosed which uses a differential planetary gear arrangement to control the frequency of a dynamo/electric machine, which derives a selected frequency, different from the base frequency of the machine. The '696 patent discloses an engine driven generator/motor that includes a variable-speed drive interposed between the engine and generator. The drive system includes bi-directional (overrun) clutches to prevent direct drive of the transmission in the generator mode, and gear-reduction in the motor (start) mode. In addition, a current sensing control (current-transformer) is used to monitor and control the power taken by the motor/generator.

A synchronous drive system is disclosed in the '768 patent, wherein a frequency changer is driven at a variable speed, and rotary induction machines are electrically "locked in step" with the frequency generator. In this particular system, the machines operate at the speed of the frequency generator. The '503 patent, by contrast, describes a two directional power flow system that utilizes multiple devices such as a vari-drive, directional clutches, synchronous motor/generator, etc. In this system, the synchronous machine is automatically controlled when in a driving mode of operation, such that the ratio change in the drive gears is adjusted in dependence upon the torque and power of the driving motor, as ascertained by the magnitude of the current drawn by the machine. The system operates to maintain the magnitude of the current at a predetermined level.

Finally, a vari-drive (toroidal-type) transmission is shown in the '252 patent, driving an alternating current machine. The transmission allows for the supplying of power at various selective amounts from a constant speed Another co-pending U.S. patent application Ser. No. 220,865, for "Variable-Speed Drive For Frequency Control Of Induction Generators," assigned to the assignee herein, utilizes a synchronous generator, as a separate (integral) exciter for an induction generator is disclosed. The system includes the capability of adjusting the slip-frequency as a function of the load over the speed range, but it does not operate in a constant-speed mode.

Yet another co-pending U.S. patent application, Ser. No. 234,761, for "All Electric Constant Speed/Variable Speed Drive/Generator Assembly," assigned to the assignee herein, discloses a relatively lightweight and compact drive/generator assembly which includes a "make-up" induction machine and a permanent magnet generator. This drive-generator assembly, differs from the drive-generator assemblies, described in this instant invention, in that it is "all electric" and does not use toroidal drive, or other mechanical elements in the mechanical power train to the planetary gearbox. However, the mechanical (toroidal type) elements are in a more advanced stage of development and have in fact a heritage of extensive use in industrial applications. To this extent, the instant invention enjoys practical advantage over the co-pending patent.

It is a primary object then, of the present invention, to provide a drive system for large generators as may be used in aircraft power generation systems; such a drive system will minimize the adverse effects of weight, size, complexity, and thermal management, normally associated with CSD and VSCF systems.

It is another object of the present invention to provide an aircraft power generation system in which the motor, and provides a means for varying the proportionate actual speeds of rotating field and armature members of an electric machine.

All of the aforementioned prior art patents are directed to power systems quite different from the dual-range variable-speed drive and variable-speed differential drive systems for frequency control of generators, as described by the present invention.

A somewhat simple system which utilizes a synchronous generator as an exciter for an induction generator is disclosed in co-pending U.S. patent application Ser. No. 220,371, for "Induction Generator/Dual-Samarium-Cobalt Generator Combination," assigned to the assignee herein. The exciter generator and induction machine disclosed therein are driven through a fixed ratio gear system which causes the exciter generator to run at a slower speed relative to the induction machine. Under this arrangement, the induction machine operates as if it is in an overspeed condition and thereby functions as a generator. While this relatively non-complex system is quite desirable for certain uses, it is somewhat limited in that it is insensitive to the different loads that may be imposed on the induction generator. By contrast, the present power system, while utilizing a highly desirable induction generator as a primary source of power, also provides the added feature of being able to adjust the negative slip-frequency. This flexibility is particularly desirable when the power system is utilized in aircraft, where loads may vary over a wide range. The ability to control the slip-frequency thereby adapts the induction-generator to meet the variable demands of the loads. drive-generator operates in a dual-range over the speed range of the aircraft's engines.

It is a further object of the present invention, to provide a differential variable-speed drive mechanism, of reduced weight and complexity, that will control the excitation-frequency of an induction-machine, when it operates in a dual-range generating mode.

It is a further object of the present invention, to provide a multi-generator (aircraft) power source that includes an induction-generator for providing dual-range primary power, an exciter machine, and a differential variable-speed drive, that controls the negative slip.

These and other objects of the present invention will become more readily apparent after a full consideration of the following description of the instant invention, and the several advantages attendant thereon.

The disclosures of all U.S. patents and co-pending patent applications referenced herein are hereby incorporated by reference.

DISCLOSURE OF INVENTION

The dual-range differential-drive system of the present invention is utilized to drive aircraft synchronous or induction type generators. The drive system, interposed between an aircraft engine and the generator, drives the generator in such a way that it runs at constant and variable speeds over the speed range of the engine. In this manner, the generator frequency is maintained approximately constant over one preselected engine speed range, and proportional to engine speed over another predetermined range.

The dual-range speed/power aspects are accomplished by utilizing either a "straight" variable-speed (toroidal) drive, or a "differential" (toroidal) drive, which functions in conjunction with planetary gear arrangements, to maintain the scheduled speed conditions for the generator. The dual-range drive can be used with both induction machines and synchronous permanent-magnet generators, and is readily adaptable via the use of clutches, and the like, to permit utilization of the primary power generators as engine starters.

The novel features which are believed to be characteristic of the invention, both as to its organization and its method of operation, together with further objects and advantages thereof, will be better understood from the following description, taken in connection with the accompanying drawings in which a presently preferred embodiment of the invention is illustrated by way of example. It is to be expressly understood, however, that the drawings are for purposes of illustration and description only, and are not intended as a definition of the limits of the invention.

BEST MODE OF CARRYING OUT THE INVENTION

As stated hereinabove, the purpose of the present invention is to develop a variable-speed drive or a "differential" variable-speed drive to operate synchronous or induction type generators in a "dual speed-range" mode. Conventional CSD and VSCF systems provide the generators with constant speed over the input speed range of the aircraft engines. For large capacity generators, the constant-frequency/constant-power nature of the conventional systems results in a power system that is costly, heavy, large in size, and complex. Such constant-power systems are also manifest by high heat-dissipation.

It is therefore a purpose of this invention to provide a drive configuration, wherein the generator operates in a dual speed-range. Typically, therefore the voltage and frequency of the generator are maintained constant over a speed-range, for example, of 0.8 to 1.1 power unit (PU) speed range, and as "voltage-proportional-to-frequency" over a speed-range, for example, of 0.5 to 0.8 PU speed range. By this means, the rating and size of the drive and the generator is dictated only by the 0.8 PU speed condition, and not by the 0.5, PU speed, as in conventional systems.

Because a constant voltage/frequency (E/F) ratio is generally suitable for many loads in an "all-electric airplane," the permanent-magnet generator is considered most appropriate to the system of the present invention, since it inherently provides this characteristic. However, a wound-rotor synchronous-machine could also be adapted to this modus-operandi.

The preferred embodiments of the power generation system of the present invention will be disclosed utilizing toroidal and "differential" toroidal drives as a part of the overall variable-speed drive system. Toroidal drives have received a great deal of attention over recent years, but practical models have generally been limited to light-duty applications. Recent developments, however, in the area of improved traction-fluids, such as "Santotrac," (developed by Monsanto Chemical Company) make such mechanical-drives practical for automotive and aerospace transmission applications. However, while the variable-speed and differential variable-speed drives are shown in the present invention, it is readily apparent that other differential drive/variable-speed drives, such as cone/ring drives, slip type clutches, and hydro-mechanical devices can be substituted for the toroidal-type drives depicted herein. Patently, it is preferred to utilize mechanical and electromechanical drive systems in an "all electric" airplane; this also eliminates the use of pressure-pumps, scavenge-pumps, oil pumps and filters, and miscellaneous valves, as incident upon hydro-mechanical systems.

Figure 1A:
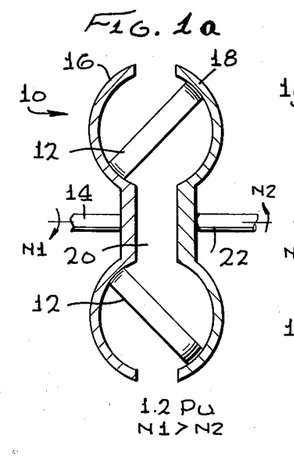
FIGS. 1(a)–(c) are schematic representations of three different settings of the rollers in a toroidal type drive.
Figure 1B:
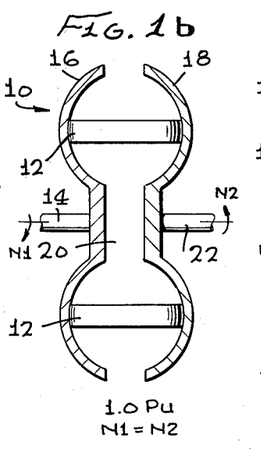
Figure 1C:
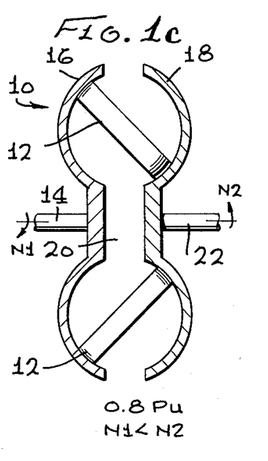

FIGS. 1(a)–1(c) are tutorial in that they schematically depict, for purposes of background illustration, the functioning of a toroidal drive (10), having three different roller settings or "steering-angles" on the drive rollers (12). FIG. 1(a) indicates a roller setting whereby input shaft (14) delivers 1.2 PU (120% input speed ($N_1$)) to the "driving" or input toroid (16), and as a result of the drive rollers being maintained in the position shown, the output toroid or disc (18) delivers a step-down speed ($N_2$) to the output shaft (22). In like manner, FIG. 1(b) indicates a roller tilt in the toroid cavity (20) such that ($N_1$) is equal to ($N_2$) while FIG. 1(c) shows a roller tilt such that at 0.8 PU input speed, ($N_1$) is less than ($N_2$). Thus, it should be readily apparent, that by varying the tilt or rotation of the rollers (12) within the cavity (20), the output speed ($N_2$) can be maintained constant with varying input speeds ($N_1$); i.e., the unit would then function as a constant speed drive.

Figure 2A:
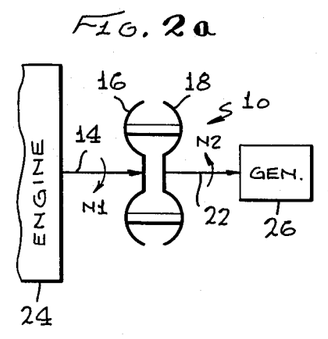
FIGS. 2(a)–2(c) are schematic representations of three different drive arrangements for providing speed control of the generator.
Figure 2B:
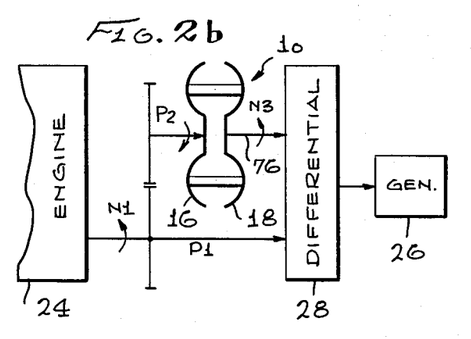
Figure 2C:
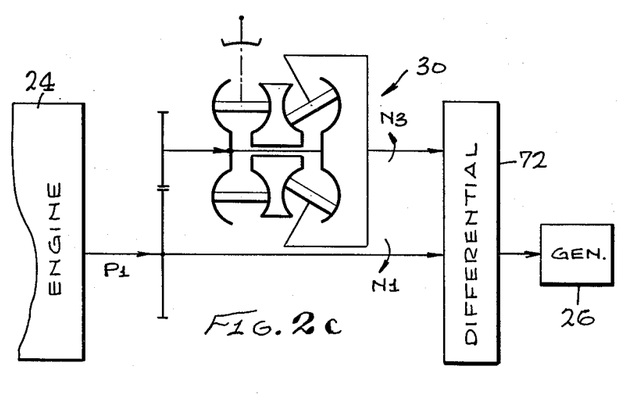

Three variations of the toroidal-type drive, as depicted in FIGS. 1(a)–1(c), are "system adapted" as in FIGS. 2(a)–2(c). In FIG. 2(a), the toroidal drive (10) is positioned between an engine (24) and the generator (26). In this particular arrangement, the toroidal drive (10) must transmit the full torque and power demands of the generator (26). In the FIG. 2(b) arrangement, which will be described in greater detail hereinbelow with reference to FIGS. 3 and 5, toroidal drive (10) output is mechanically summed with the mechanical power ($P_1$) feeding from the engine (24) to the differential gearbox (28). In this instance, in accordance with the present invention, the output of the toroid drive is uni-directional and it must make up the difference between the input and constant output speed. Consequently, if the output power is constant at 50% input speed, it must make up 50% power.

A more preferred arrangement is depicted in FIG. 2(c). Again, this arrangement will be described in greater detail hereinbelow with reference to FIG. 6. In this instance, a differential-toroidal drive (30) replaces the straight toroidal drive (10), so that power may be added or subtracted relative to the input mechanical power ($P_1$). In this configuration a "straight-through" condition may exist, wherein the differential toroid output speed ($N_3$) may be, holding or locking one element of the differential (72), to allow torque transmission. Also, as stated above, the output speed ($N_3$) can be changed in both direction and amplitude. The drive elements of this type of configuration then, when operating with a variation in engine speed of 50%, need only transmit (add or subtract) 25% power (see FIG. 7). Specific to the instant invention, however, under the dual-range drive concept the differential drive need only make up about ±10%.

Figures 3, 4, 5:
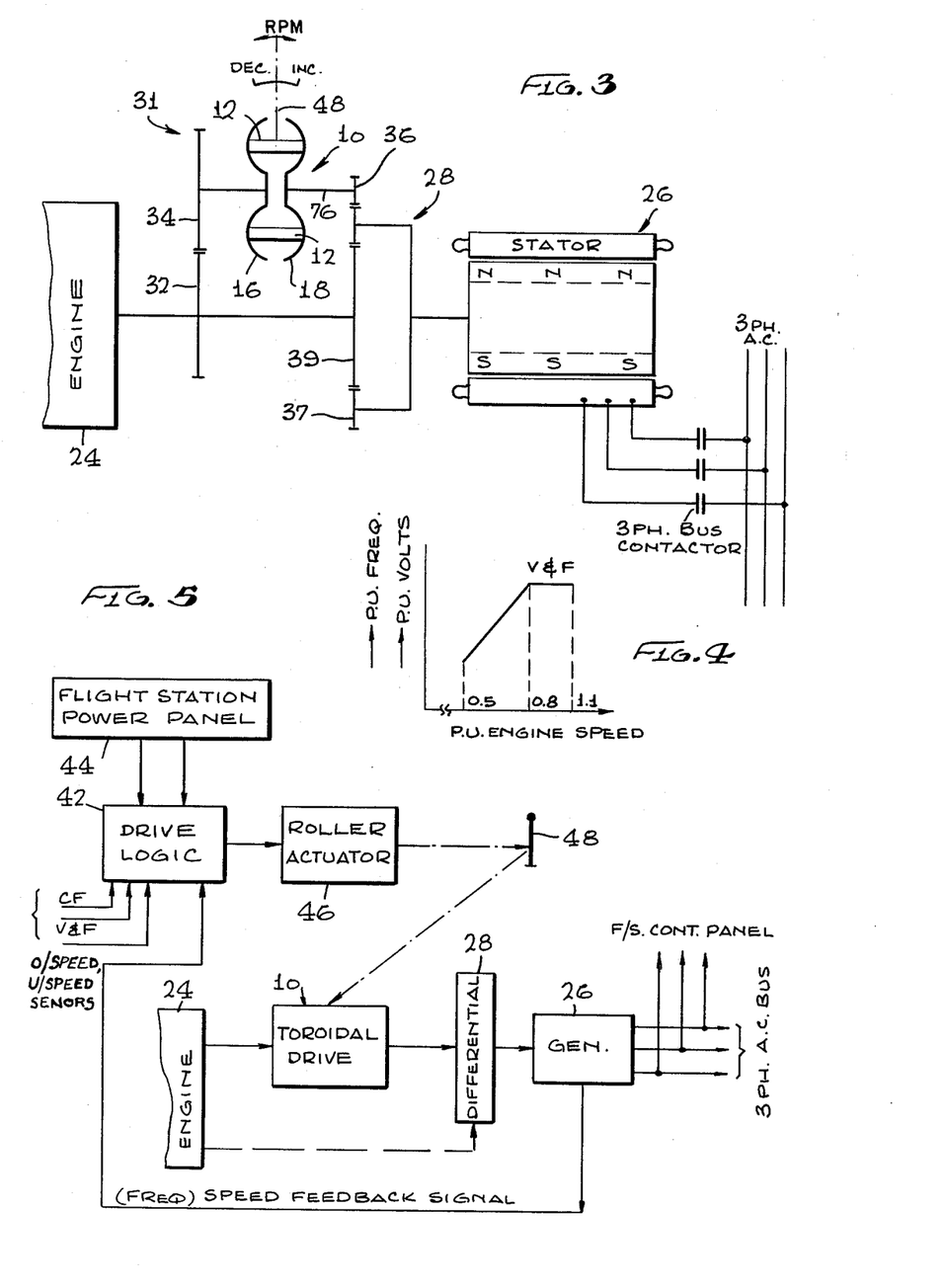
FIG. 3 is a schematic representation, similar to FIG. 2(b), showing a variable-speed drive adapted to a permanent magnet generator, in accordance with one preferred embodiment of the present invention.
FIG. 4 is a graph showing the frequency and voltage characteristics of a generator driven in accordance with the present invention over a varying engine speed range.
FIG. 5 is a block diagram of a closed-loop speed-control for the generator configuration of FIG. 3.

Referring now to FIGS. 3–5 there is shown therein in greater detail, a first preferred embodiment of the present invention. These figures show the utilization of a toroidal-drive (10) to maintain the constant speed of a permanent magnet drive-generator (26) over the 0.8 PU to 1.1 PU speed range of the engine (24). This speed control is accomplished by changing the tilt of the toroid drive rollers (12) in response to a speed-control servo loop (FIG. 5) which monitors the speed (frequency) of the drive-generator (26).

The toroidal-drive makes the drive of the power generation system of the present invention a highly desirable all-electromechanical system. Referring to FIG. 3, the input toroid or disc (16) is shown driven by an input gear-set (31) which includes a drive gear (32) and a driven gear (34). The output disc (18) in turn drives the ring gear (36) of the planetary gear box/differential (28). The arrangement, size, pitch, etc., of the ring, planetary, ring and sun gear drives (36), (37), (39) are optional and readily determined by the designer of the drive gear/transmission system.

The speed-control logic system (FIG. 5) includes a drive logic control (42), activated via signal from a flight station power panel (44), a roller actuator (46), connected to steering-control mechanism (48) for changing the angle of the toroid drive rollers (12). In operation, the system monitors the speed (frequency) of the drive-generator (26) and changes the steering-angle, or tilt of the drive rollers (12) in response to deviations from the scheduled speeds, established for the generator (26). Thus, the roller tilt changes as a function of input speed changes and load changes. Again, gear ratios of the input gear-set (31) and the planetary differential (28) can be arranged to permit the output disc (18) to correct speed around the mid point of the 0.8 PU to 1.1 PU speed range, that is, approximately ±10% only. The power capacity of the toroidal drive (10) is therefore very small relative to the large capacity of the generator (26).

At speeds below the 0.8 PU value, the speed control logic signals the steering actuator to control the generator (26) so that its frequency is proportional to the input-speed; the voltage of the generator (26) would also be proportional to this frequency. This latter action could be accomplished by a physical constraint on the tilt of the drive rollers (12), or an active control of the rollers (12) to maintain the proportional-speed condition. Yet another method would be to by-pass the toroidal drive (10) and drive the generator (26) directly, however, this latter approach, however, would require the use of electro-mechanical clutches. FIG. 4 shows the nature of the drive-generator (26), speed (frequency)/voltage characteristic versus PU engine speed changes.

Figure 6:
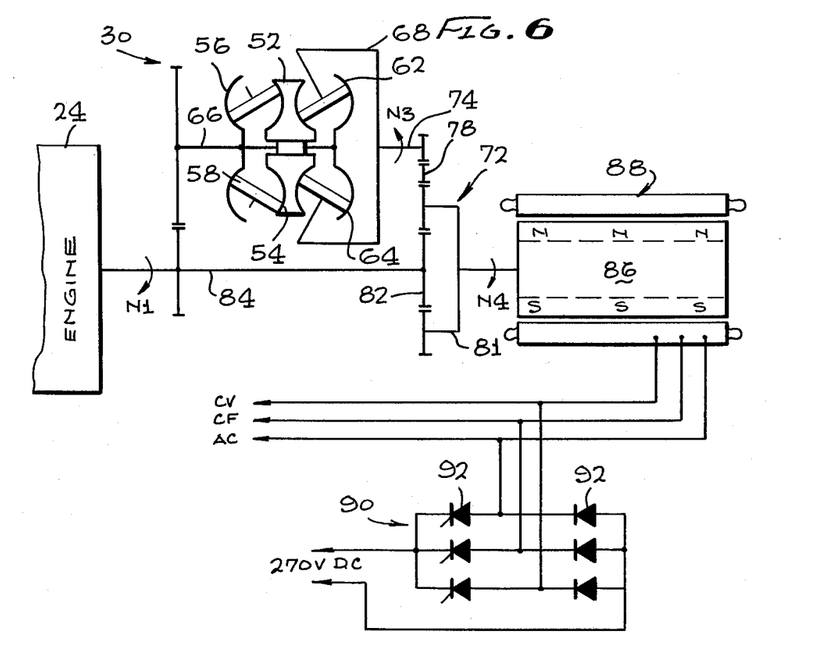
FIG. 6 is a schematic representation, similar to FIG. 2(c), showing a power generator configuration in accordance with another preferred embodiment of the present invention.
Figure 7:
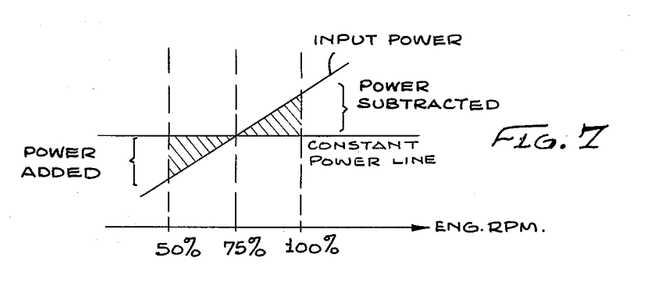
FIG. 7 is illustrative of the (differential drive) power flows when constant power output is provided over a 2:1 input speed range.

Referring now to FIG. 6, there is shown a schematic representation of the FIG. 5 block diagram. In this figure, the "differential" toroidal drive (30) is utilized in the upper mechanical power train. The drive is "differential" in the sense that the central element (52) has two drive sides. The left side (54) is driven from the input disc (56) via the variable angle drive rollers (58), while the right side (62) is driven by the disc (64), which is also physically connected via shaft (66) to the input disc (56). Thus, if there is any difference in speeds, the speed difference will be reflected by a rotation of the right roller-cage (68) at a speed, and in a direction, such that a "correcting" input will be made at (N$_3$) in the differential gearbox (72). This embodiment, therefore, unlike the drive system shown in FIG. 3, has the ability to rotate its output shaft (74) in either direction, and at a speed dictated by the tilt of the left drive rollers. In contrast, FIG. 3 exemplifies a variable-speed-drive system that can change the speed (N$_3$) of the output shaft (76) above and below a median level, but it cannot change the direction of the output shaft (76).

Further examination of FIG. 6, shows that there could be a speed-input condition when the output shaft (74) would be stationary, thereby holding ring gear (78). The three phase synchronous generator (88) will then be driven by the planetary gear cage (81) via the sun gear (82) which is connected to the drive shaft (84) from the engine (24). For other speed conditions, the ring-gear (78) will rotate, both as to direction and speed, so as to correct the speed of the rotor (86) of the generator (88) in response to a roller-drive logic system (not shown) similar to the logic system of FIG. 5. Such a system would be programmed and operate to steer the drive rollers of the differential toroidal drive (30) in the manner described with reference to FIG. 5.

As described, over the 0.8 to 1.1 PU speed input range, the rotor speed (N$_4$) can be maintained constant, by the differential drive operating mid-point between the 0.8 to 1.1 PU speed range; this shows that the power-level of the "make-up" control "differential-drive" can be very small. On the other hand, below 0.8 PU input-speed, the differential-drive will reach its scheduled limit of authority, so any decrease in speed below the 0.8 PU condition will result in a similar decrease in the output voltage and frequency of the generator (88). Thus, the power system operates as a "dual-speed-range" system.

In a further aspect of the generator drive system of FIG. 6, a three phase full-wave bridge rectifier (90) is shown in which the positive diodes (92) are silicon controlled rectifiers (SCR's), whose phase angle can be advanced or retarded by a 270 VDC voltage-regulator (not shown). At input speeds where the voltage and frequency output of the generator (88) is constant, the phase-angle of the SCR's (92) will be retarded to harness the voltage to the 270 V level. Below the 0.8 PU speed, however, as the voltage/frequency of the generator (88) decreases, the phase-angle will be advanced to maintain the voltage at the same 270 V level. This action will continue down to the 0.5 PU input speed, at which point the SCR's (92) will be fully advanced and so at this speed, they will function as though they were conventional diodes. It is implicit in this that the line-to-line voltage of the three phase power must be 200 V, in order to yield 270 Vdc at the fifty percent speed condition. At constant speed, however, the three phase voltage will be 400 volt, line-to-line.

Figure 8:
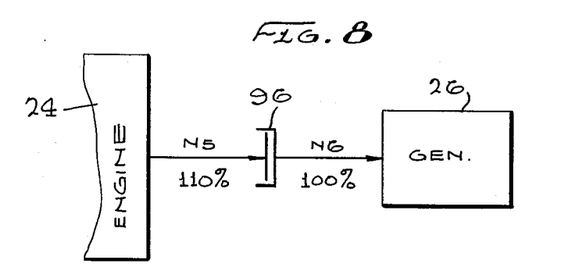
FIG. 8 is a schematic representation of a slip-clutch drive arrangement of possible application, when the speed range is small.

FIG. 8 shows a slip clutch (96) which can function as a limited speed range vari-drive; this can be an electrographitic clutch, a friction clutch or a dynamic coupling, such as an eddy-current or induction-coupling. However, such a vari-drive is "one way" and it can only "slip" from a higher input speed to a lower speed. Power is therefore wasted in proportion to the "slip." Such a drive is not elegant relative to the above described vari-drive, but it has the advantage of simplicity. Such simple drives are marginally suitable to the instant invention where the dual range mode is effective, but they would be very inefficient and unsuitable in a constant speed/constant output power system, when the power capacities are high.

Figure 9:
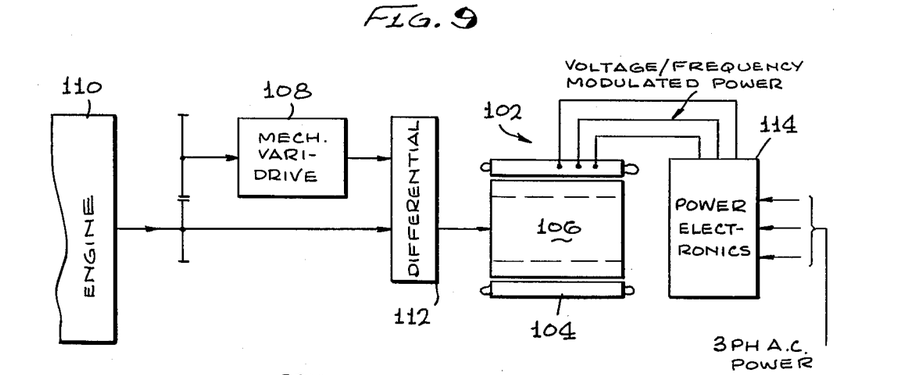
FIG. 9 is a schematic representation showing a power generator and variable-speed drive for an induction generator, in accordance with another preferred embodiment of the present invention.

FIG. 9 shows another embodiment of a dual-range drive in accordance with the present invention driving a main generator (102), including a three phase ac stator (104) and a squirrel cage induction rotor (106). As described in the aforementioned co-pending U.S. patent applications Ser. No. 220,865, and Ser. No. 220,371, it is necessary, when an induction machine operates as an induction generator, that its rotor run at a condition of "negative-slip," or at hypersynchronous speed, with respect to the rotating field, established by the three phase power applied to its stator. The output power of the generator (102) is a function of this negative-slip and is roughly proportional to it over small values of slip. Typically, these small values of slip would be equivalent to those between "no-load-torque" and the "pull-out-torque," when it is operating as a motor.

As shown in FIG. 9, the mechanical output power of the mechanical variable-speed drive unit (108), is combined with the output from the engine (110) via a mechanical differential gearbox (112), in such a way that the speed of the squirrel-cage rotor (106) is connected and controlled in response to speed control logic. In the case of the dual-range drive, the induction generator (102) could provide the following power characteristics:

50%–80% engine speed P$\alpha$N$_E$/V$\alpha$F

80%–100% engine speed P=K and V=K where
P=Power
N$_E$=engine speed
V=generator voltage
F=generator frequency, H$_z$
K=a constant In such speed modes, therefore, the angular rotation of the supply power to the stator ($\omega_s$) would be dictated by the scheduled speed of the rotor (106), ($\omega_n$), and the electric load connected across the stator (104) output winding. This rotating field $\omega_s$ would at all times be less than the rotor speed, $\omega_n$ to ensure that the machine operates in a generating mode. The angular rotation of the supply field, in a motor or generator mode, would be:

$$\omega_s = \omega_n + s\omega_n \qquad (1)$$

where
- $\omega_s$ = angular rotation of supply field
- $\omega_n$ = angular rotation of rotor
- $\omega_s = (\omega_s - \omega_n)/\omega_s$ = slip In the generating mode, s would be negative and, therefore, $s_n$ would be negative.

From the foregoing, it can be seen that, if over the 80%–100% speed range, the squirrel-cage rotor (106) is controlled at constant speed then, for any given load, the speed of the supply field would be fixed at some constant negative slip. However, if at that constant speed the load increased, then it would be necessary for the negative-slip to increase slightly to meet that increased load. It is well known to those expert in electronic technology, that the efficiency of the "idealized" induction machine; (i.e., considering no losses) is related by the following equation:

$$\eta = \frac{I_2^2 R_2/s}{I_2^2 R_2(1-s)/s} \text{ or} \quad (2)$$

$$\eta = 1/(1-s) \quad (3)$$

where
- $I_2$ = the rotor current
- $R_2$ = the rotor resistance
- s = slip

If $\omega_s - \omega_n/\omega_s$ is substituted for S, then $\eta = \omega_s/\omega_n$ (4)

From (3), it can be seen that if the slip is small, then the efficiency of the idealized generator can be relatively high. This equation also shows that if the machine is run at twice synchronous speed, where s = −1, the efficiency is only 50%. Similarly, if it were driven at three times the synchronous speed it would be only 33⅓%. It can now be seen that to keep the efficiency relatively high, the use of the dual-range speed control of the present invention is most efficacious.

Also depicted in FIG. 9 is a static power electronics system (114) which is used to supply static field of the induction generator (102). As is well known in the art, such a system permits the development of synthesized ac rotating field by means of phase controlled SCR's, or electronically-commutated power transistors. Therefore, a detailed implementation of these power electronics is not shown, and indeed, is not essential for an understanding of the novel dual-range drive control system of the present invention. Essentially, as described above, it is necessary only that the power electronics (114) establish a rotary field, $\omega_s$, that rotates slower than the squirrel-cage rotor (106), and that the field be responsive to the speed of the rotor, $\omega_n$, and the kilowatt loading on the induction generator (102).

Figure 10:
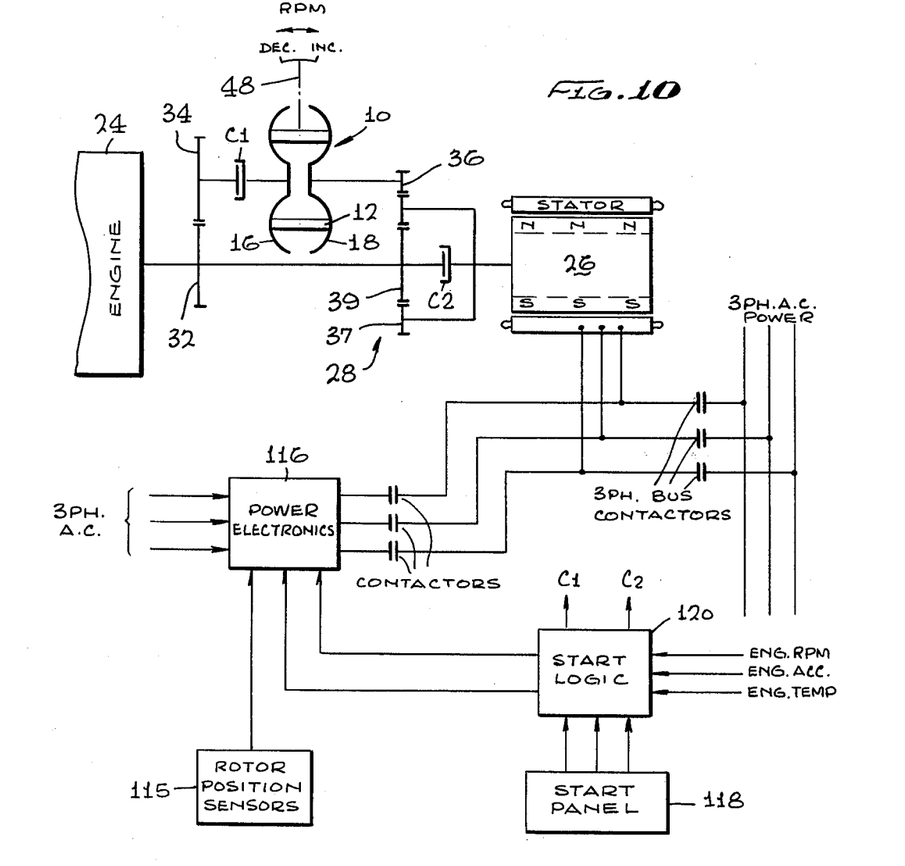
FIGS. 10, 11 and 12 are modifications of the FIGS. 3, 6 and 9 power generation configurations, wherein clutch elements are added to adapt the respective power systems to engine-starting roles. In the various drawing figures, like numerals denote like parts.
Figure 11:
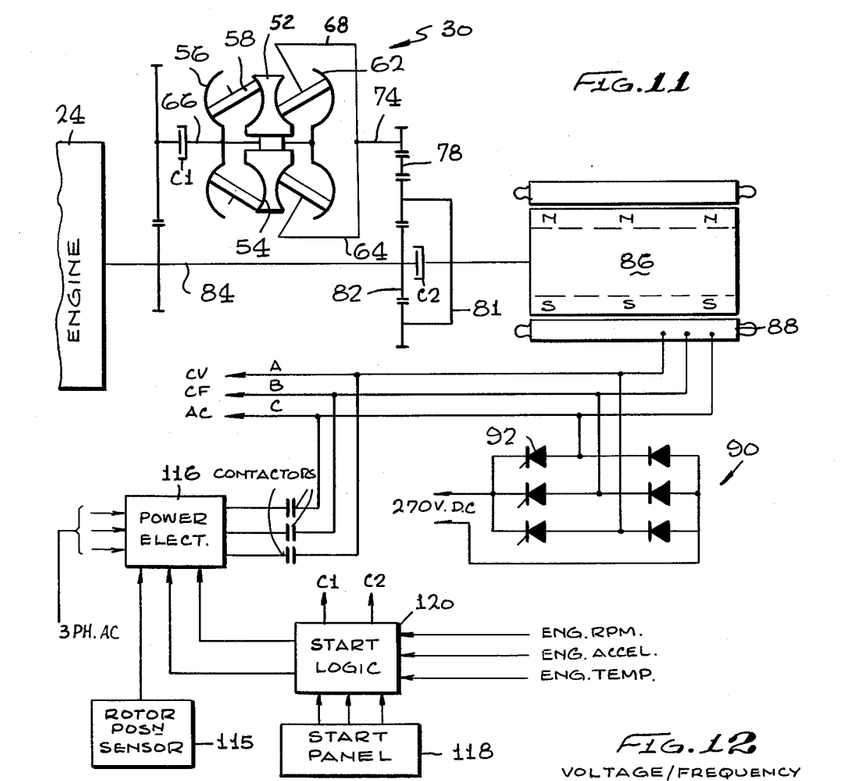
Figure 12:
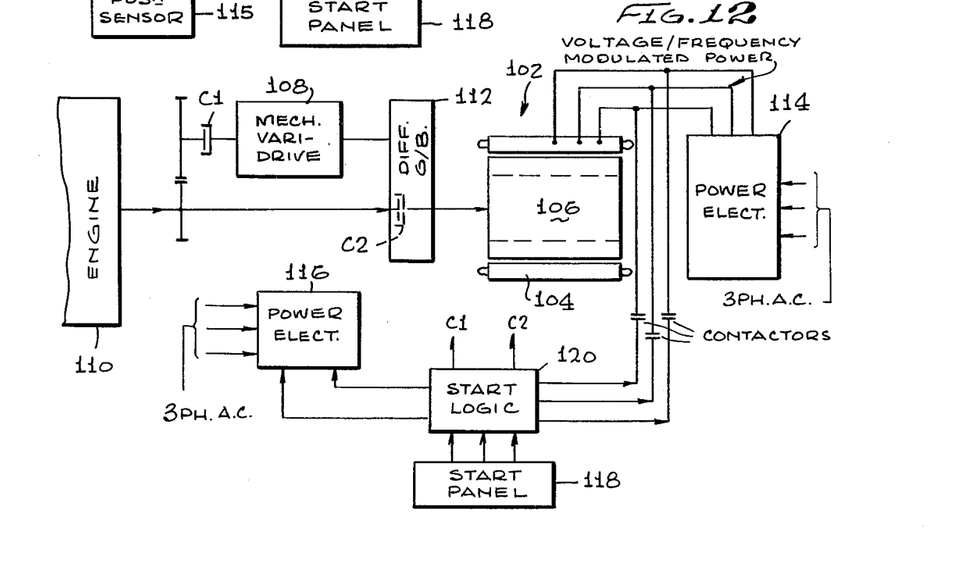

FIGS. 10–12 show the adaptation of the drive-generator systems of the present invention to an engine starting mode of operation. As disclosed in co-pending U.S. application Ser. No. 183,079 for "Direct-Driven Generator System for Environmental Control System and Engine Starting," assigned to the assignee herein, and the aforementioned co-pending U.S. application Ser. No. 220,371, respectively, a synchronous generator can be used in a synchronous starter mode, and an induction generator can be operated as an induction motor starter where the applied voltage and frequency is programmed from a low value to a value corresponding to the engine idle speed. In FIGS. 10 and 11, wherein the variable-speed toroidal drive, and differential toroidal drives of the present invention operate in conjunction with the permanent magnet generator (26) and the induction generator (106); the rotor position sensor (115) is used to "commutate" the power electronics (114).

Such rotor position sensors are not necessary for the FIG. 12 generator drive system wherein the induction generator (102) is used as a starter. In all cases, however, the frequency and voltage will be programmed in such a way that the torque applied to the engine and the engine acceleration rate will be controlled as a function of the "sensed" engine speed. Thus, the torque will be programmed to insure adequate torque, to meet the "load-torque" plus the "acceleration-torque." Speed sensing signals adjust these torque-levels by controlling the voltage/frequency output of the power electronics; while the rate-change-of-frequency, df/dt, is effective in controlling the engine speed change versus time (in seconds).

In FIG. 10, when starting is initiated from the flight station start panel (118), clutch (C₁) will be open and clutch (C₂) closed by electric control from the start logic system (120). At this time, a pre-programmed control in the start logic system (120) will progressively increase the power electronics (116) output voltage and frequency from a very low value up to the value required to drive the engine (24) up to its idle speed. Slightly prior to this point, a speed signal will initiate the "starter cut-out" signal. During the start-cycle, if the engine fails to "light-up" the start cycle may be terminated automatically, or manually, from the flight station.

In FIG. 11, the starting sequence is identical, except that the clutch (C₁) allows the differential toroidal drive (30) to free-wheel as opposed to the free-wheeling of the vari-drive toroidal drive (10) in FIG. 10.

Referring to FIG. 12, the starting control and sequence is similar to that described hereinabove with reference to FIGS. 10 and 11, except that a rotor position sensor is not required to "commutate" the power electronics (116). Here again, however, the voltage and frequency are programmed from a low value up to the "idle-engine-value." The other difference is that the "delivered torque" to the engine (110) is a function of the "slip." In the case of the permanent magnet generators (26) and (88) exemplified in FIGS. 10 and 11, the torque is controlled by the "power-angle"; i.e., the field axis of the rotor versus the axis of the rotating field. It is also of note that there is no "slip" in this case, wherein the rotor may be at a different speed from the rotating field, so that the rotor moves "synchronously" with the speed of the rotating field.

It is apparent that there has been provided with this invention a novel Dual-Range Differential-Drive for Synchronous and Induction Generators, which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A dual range aircraft power generation system comprising:

at least one engine;
a drive generator; and
a dual-range drive means interposed between said engine and said drive generator for selectively driving said generator at constant and variable speeds over the speed range of said engine to produce scheduled dual-range power characteristics, said dual range drive means including a planetary differential gearbox and vari-drive means arranged to receive mechanical input from said engine, said vari-drive means also being adapted to provide mechanical input to said planetary differential gearbox.

2. A dual-range aircraft power generation system as in claim 1 wherein said differential gearbox includes interacting gear elements comprising a first gear element driven by said engine, a second gear element arranged to be driven by said vari-drive means, and a third gear element arranged to drive said generator.

3. A dual-range aircraft power generation system as in claim 2 wherein said first gear element comprises a sun-gear, said second gear element comprises a ring-gear, and said third element comprises a planetary-gear.

4. A dual-range aircraft power generation system as in claim 2 wherein said vari-drive means comprises a toroidal drive having drive rollers interposed between input and output toroids.

5. A dual-range aircraft power generation system as in claim 2 wherein said vari-drive means comprises a differential mechanical vari-drive adapted to provide said mechanical input so as to modulate the speed and direction of said second gear element.

6. A dual-range aircraft power generation system as in claim 5 wherein said differential mechanical vari-drive comprises a differential toroidal drive having a central element interposed between input and output toroids, said toroidal drive further including a first set of drive rollers interposed between said input toroid and said central element and a second set of drive rollers interposed between said central element and said output toroid.

7. A dual-range aircraft power generation system as in claim 4 wherein said output toroid is connected to said second gear element so as to be adaptable to impart varying speeds to said differential gearbox via said second and third gear elements.

8. A dual-range aircraft power generation system as in claim 6 wherein said output toroid is connected to said second gear element so as to be adaptable to impart varying speeds to said differential gearbox via said second and third gear elements.

9. A dual-range aircraft power generation system as in claim 1 including drive-logic means for controlling the speeds at which said dual-range drive means selectively drives said generator.

10. A dual-range aircraft power generation system as in claim 9 wherein said drive-logic means controls said vari-drive means.

11. A dual-range aircraft power generation system as in claim 4 including drive-logic means for controlling the tilt of said drive rollers and thus the speeds at which said dual-range drive-means selectively drives said generator.

12. A dual-range aircraft power generation system as in claim 6 including drive-logic means for controlling the tilt of said second set of drive rollers and thus the speeds at which said dual-range drive means selectively drives said generator.

13. A dual-range aircraft power generation system as in any one of claims 1, 2, 4, 5, 6, 9, or 10 wherein said dual-range drive means selectively drives said generator so that the generator posses the following power generating characteristics:
 (1) constant-power/constant-speed over about 0.8 to 1.1 PU engine input speed; and
 (2) variable-power/variable-speed over about 0.5 to 0.8 PU engine input speed.

14. A dual-range aircraft power generation system connected to said drive rollers and associated with said speed-logic means, as in claim 11 including electromechanical actuator means said drive-logic means being adapted to sense the output frequency and thus the speed of said generator and to cause said actuator means to adjust the tilt of said drive rollers.

15. A dual-range aircraft power generation system as in claim 12 including electromechanical actuator means connected to said second set of drive rollers and associated with said drive-logic means, said drive-logic means being adapted to sense the output frequency and thus the speed of said generator and to cause said actuator means to adjust the tilt of said second set of drive rollers.

16. A dual-range aircraft power generation system as in any one of claims 1, 2, 4, 5, 6, 9, 10, 14, or 15 wherein said drive generator comprises a synchronous permanent magnet generator.

17. A dual-range aircraft power generation system as in claim 16 wherein said permanent magnet generator comprises a samarium cobalt generator.

18. A dual-range aircraft power generation system as in any one of claims 1, 2, 4, 5, 6, 9, 10, 14, or 15 wherein said drive generator comprises a squirrel-cage induction machine.

19. A dual-range aircraft power generation system as in claim 18 including power electronic means for supplying the static field of said induction generator.

20. A dual-range aircraft power generation system as in any one of claims 1, 4, 5, or 6 including clutch means associated with said differential gearbox and said vari-drive means for adapting said drive generator for use as an engine starter to start said engine.

21. A dual-range aircraft power generation system as in claim 20 wherein said differential gearbox includes straight "drive-through" means connecting said engine and said drive generator, said clutch means including a first clutch element associated with said vari-drive means for selectively disconnecting said vari-drive means, and a second clutch element associated with said differential gearbox for selectively disconnecting said straight "drive-through" means, whereby when said first clutch element is closed and said second clutch element is open said generator operates in a generator mode, and when said first clutch element is open and said second clutch element is closed said generator operates in a starter mode.

22. A dual-range aircraft power generation system as in claim 21 wherein said first and second clutch elements are electromagnetic clutches.

23. A dual-range aircraft power generation system as in claim 21 including power electronics means for developing a synthesized ac rotating field in the stator of said drive generator and start-logic means for controlling said power electronics means to produce a rotational speed and field strength so as to attain the desired speed and acceleration.

24. A dual-range aircraft power generation system as in claim 20 wherein said drive generator comprises a synchronous permanent magnet machine.

25. A dual-range aircraft power generation system as in claim 23 wherein said drive generator comprises a synchronous permanent magnet machine.

26. A dual-range aircraft power generation system as in claim 26 wherein said drive generator comprises a squirrel-cage induction machine.

27. A dual-range aircraft power generation system as in claim 23 wherein said drive generator comprises a squirrel-cage induction machine.

28. A dual-range aircraft power generation system comprising:
an aircraft engine;
a generator;
a dual-range drive system interposed between said engine and said generator, said drive system including a first drive mechanism adapted to drive said generator at constant speed over a first preselected speed range of said engine, and a second drive mechanism associated with said first drive mechanism and adapted to drive said generator at variable speeds over a second preselected speed range of said engine, whereby said generator produces a scheduled dual-range power characteristic over the speed range of said engine.

29. A dual-range aircraft power generation system as in claim 28 including drive-logic means for controlling the speeds at which said dual-range drive system selectively drives said generator.

30. A dual-range aircraft power generation system as in any one of claims 28 or 29 wherein said dual-range drive system is adapted to selectively drive said generator so that the generator possesses the following power generating characteristics:
constant-power/constant-speed over about 0.8 to 1.1 PU engine input speed; and
variable-power/variable-speed over about 0.5 to 0.8 PU engine input speed.

31. A dual-range aircraft power generation system as in any one of claims 28 or 29 wherein said drive generator comprises a synchronous permanent magnet generator.

32. A dual-range aircraft power generation system as in claim 31 wherein said permanent magnet generator comprises a samarium cobalt generator.

33. A dual-range aircraft power generation system as in any one of claims 28 or 29 wherein said drive generator comprises a squirrel-cage induction machine.

34. A dual-range aircraft power generation system as in claim 33 including power electronic means for supplying the static field of said induction generator.

* * * * *